United States Patent
Sato et al.

(10) Patent No.: US 9,489,843 B2
(45) Date of Patent: Nov. 8, 2016

(54) MAP PROVISION SERVER AND MAP PROVISION METHOD

(71) Applicant: HONDA MOTOR CO., LTD., Tokyo (JP)

(72) Inventors: Aya Sato, Tokyo (JP); Hanae Tezuka, Tokyo (JP); Yoshiaki Hirai, Tokyo (JP); Tsuyoshi Iida, Tokyo (JP); Takashi Ogi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/779,665

(22) PCT Filed: Mar. 26, 2014

(86) PCT No.: PCT/JP2014/058597
§ 371 (c)(1),
(2) Date: Sep. 24, 2015

(87) PCT Pub. No.: WO2014/157367
PCT Pub. Date: Oct. 2, 2014

(65) Prior Publication Data
US 2016/0049075 A1    Feb. 18, 2016

(30) Foreign Application Priority Data
Mar. 28, 2013    (JP) .................................. 2013-069155

(51) Int. Cl.
*G08G 1/09*    (2006.01)
*G08G 1/0967*    (2006.01)
(Continued)

(52) U.S. Cl.
CPC ............ *G08G 1/0967* (2013.01); *G08G 1/0112* (2013.01); *G08G 1/0141* (2013.01); *G08G 1/13* (2013.01); *G08G 1/137* (2013.01); *G09B 29/007* (2013.01); *G08G 1/0133* (2013.01); *G08G 1/09626* (2013.01)

(58) Field of Classification Search
CPC ............ G08G 1/0967; G08G 1/0112; G08G 1/0141; G08G 1/13; G08G 1/137; G08G 1/0133; G09B 29/007

USPC .......................................................... 340/905
See application file for complete search history.

(56) References Cited

U.S. PATENT DOCUMENTS

2007/0040705 A1* 2/2007 Yoshioka ............. G08G 1/0969
340/988
2011/0060495 A1 3/2011 Kono et al.
(Continued)

FOREIGN PATENT DOCUMENTS

JP    2003-123185    4/2003
JP    2007-323281    12/2007
(Continued)

OTHER PUBLICATIONS

International Search Report, Date of mailing: Apr. 28, 2014 (Apr. 28, 2014).

*Primary Examiner* — Kerri McNally
(74) *Attorney, Agent, or Firm* — Rankin, Hill & Clark LLP

(57) ABSTRACT

In order to enable information about dangers from the perspective of users using various means of transportation to be collected, a map provision server (1) is equipped with: a data acquisition unit (11) that acquires from multiple vehicles (20) driving information (FCD) containing instances of sudden braking and the locations where the sudden braking occurred; a dangerous location identification unit (121) which, on the basis of the acquired driving information, identifies dangerous locations (41) where many instances of sudden braking have occurred; and a posting column generation unit (122) that places the dangerous locations (41) on a map and generates a posting column (60) capable of receiving postings from users and associated with the dangerous locations (41) placed on the map. The map on which the dangerous locations (41) have been placed is provided to a user terminal (4).

18 Claims, 7 Drawing Sheets

(51) Int. Cl.
*G08G 1/01* (2006.01)
*G08G 1/13* (2006.01)
*G08G 1/137* (2006.01)
*G09B 29/00* (2006.01)
*G08G 1/0962* (2006.01)

(56) References Cited

U.S. PATENT DOCUMENTS

2011/0153199 A1* 6/2011 Morimoto .......... G01C 21/3697
　　　　　　　　　　　　　　　　　　　　　701/533

2011/0291863 A1　12/2011　Ozaki et al.
2013/0253809 A1*　9/2013　Jones .................. G08G 1/0112
　　　　　　　　　　　　　　　　　　　701/117

FOREIGN PATENT DOCUMENTS

| | | |
|---|---|---|
| JP | 2008-015561 | 1/2008 |
| JP | 2011-59921 | 3/2011 |
| JP | 2011-247831 | 12/2011 |
| WO | 2007/032169 | 3/2007 |

* cited by examiner

RISK INFORMATION DB 14

FCD STORAGE REGION

| SUDDEN BRAKING OCCURRENCE SITE | FCD | | | SUDDEN BRAKING NUMBER OF TIMES | TOTAL NUMBER OF VEHICLES |
|---|---|---|---|---|---|
| | TIME | WINDSHIELD WIPER | ... | | |
| SITE A (OO INTERSECTION) | am9:00 | OPERATING | ... | OO TIMES | XX VEHICLES |
| | pm1:00 | NOT OPERATING | ... | | |
| | ... | ... | ... | ... | ... |
| ... | | | | | |

FIG. 2A

RISK INFORMATION DB 14
TRAFFIC ACCIDENT INFORMATION STORAGE REGION

| AREA | | SITE | ACCIDENT CONTENTS | | |
|---|---|---|---|---|---|
| | | | OCCURRED ACCIDENT | OCCURRENCE DATE/TIME | WEATHER |
| ACCIDENT OCCURRENCE AREA 1 | | SITE X | VEHICLE – CAR | O MONTH/ X DAY am8:30 | RAIN |
| | | | VEHICLE – BICYCLE | X MONTH/ O DAY Pm3:00 | SUNNY |
| | | | ⋮ | ⋮ | ⋮ |
| ZONE-30 AREA 2 | | SITE Y | — | — | — |
| | | ⋮ | ⋮ | ⋮ | ⋮ |

FIG. 2B

RISK INFORMATION DB 14

POSTING CONTENTS STORAGE REGION

| DANGEROUS LOCATION | USER | POSTING CONTENTS ||||
| | | TYPE OF DANGER | TRANSPORTATION MEANS | TIME SLOT | FREE INPUT |
|---|---|---|---|---|---|
| SITE A (○○ INTERSECTION) | USER A | SELECTION A | SELECTION A | SELECTION A | ... |
| | USER B | SELECTION B | SELECTION B | SELECTION B | ... |
| | ... | ... | ... | ... | ... |
| ... | | | | | |

FIG. 2C

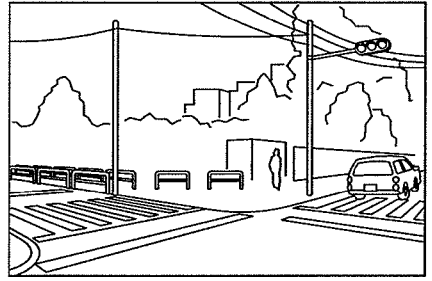

60 ROAD CONDITIONS AROUND OO WARD, OO DISTRICT 2, HOUSE NUMBER O

● NUMBER OF VEHICLES SUDDENLY BRAKING
VERY HIGH (ESPECIALLY AT NIGHT)
● PAST OCCURRED ACCIDENTS
CAR – CAR

CAR – PEDESTRIAN

EVERYONE'S OPINION (CONCERNED PEOPLE : 32)
✓ POOR VISIBILITY (19 PEOPLE)
✓ NARROW ROAD / NO SIDEWALK (12 PEOPLE)

POST YOUR OPINION [POST] — 62

1. PLEASE SELECT TYPE OF DANGER (MULTIPLE SELECTIONS ALLOWED)
   ○ MANY SPEEDING CARS (3 PEOPLE)
   ○ NARROW ROAD / NO SIDEWALK (12 PEOPLE)
   ○ POOR VISIBILITY (19 PEOPLE)
   ○ MANY SUDDENLY APPEARING PEDESTRIANS/BICYCLES (0 PEOPLE)
   ○ OTHER (0 PEOPLE)

— 61

2. PLEASE GIVE DETAILS OF DANGER (FREE INPUT)
   * RECEIVED OPINION WILL NOT BE PUBLISHED ON WEBSITE

3. PLEASE SELECT YOUR TRANSPORTATION MEANS (MULTIPLE SELECTIONS ALLOWED)

CAR (6 PEOPLE) ○   BICYCLE (9 PEOPLE) ○   PEDESTRIAN (11 PEOPLE) ○   MOTORCYCLE (0 PEOPLE) ○   SCOOTER (2 PEOPLE) ○

4. PLEASE SELECT TIME SLOT IN WHICH HAVING SENSED DANGER
   ○ 7:00-10:00 SCHOOL COMMUTE (WORK COMMUTE) TIME SLOT (16 PEOPLE)
   ○ 10:00-16:00 DAYTIME TIME SLOT (6 PEOPLE)
   ○ 16:00-19:00 RETURNING HOME TIME SLOT (8 PEOPLE)
   ○ 19:00 - 7:00 NEXT DAY, NIGHTTIME TIME SLOT (2 PEOPLE)

5. PLEASE SELECT WEATHER WHEN SENSING DANGER
   ○ SUNNY (13 PEOPLE)
   ○ CLOUDY (8 PEOPLE)
   ○ RAINING (10 PEOPLE)
   ○ SNOWING (0 PEOPLE)

FIG. 4

MAP PROVISION SERVER AND MAP PROVISION METHOD

TECHNICAL FIELD

The present invention relates to a map provision server and map provision method that provide a map enabling easy posting of dangerous locations by a general user.

BACKGROUND ART

Electronic maps have come to be used in various forms accompanying the development of information processing technology in recent years. For example, in addition to sightseeing maps and gourmet maps prepared by arranging sight-seeing areas, restaurants, etc. on maps, traffic safety maps, etc. that educate traffic safety by showing locations of the repeated occurrence of traffic accidents are widely being employed.

However, with traffic safety maps, it has been demanded to show high-risk locations on the map in order to educate traffic safety to local residents.

In this point, the high-risk locations have conventionally been collected based on traffic accident information managed by police stations, etc., questionnaire results from local residents, and the like. In addition, Patent Document 1 describes a risk information collection and distribution apparatus that collects high-risk locations for the users of automobiles by collecting driving information such as sudden turning and sudden braking from the automobiles while traveling, and accumulating in a server.

Patent Document 1: Japanese Unexamined Patent Application, Publication No. 2003-123185

DISCLOSURE OF THE INVENTION

Problems to be Solved by the Invention

However, in the case of using traffic accident information, etc. managed by police stations, only locations at which traffic accidents have already happened are shown, and it has not been possible to show potential dangerous locations. Additionally, at sites at which traffic accidents repeatedly occur, countermeasures are often already being conducted such as the installation of curve mirrors and traffic lights, and thus there has also been a problem in lacking a real-time property.

In addition, with the above-mentioned risk information collection and distribution apparatus of Patent Document 1, although risk information from the perspective of automobiles can be collected, it is not possible to collect risk information from the perspective of pedestrians and users utilizing other transportation means such as bicycles, and thus there has been a margin for further improvement in generating a traffic safety maps.

It should be noted that, although it is possible to collect risk information from the perspective of users other than automobile users by adopting the aforementioned questionnaire results from local residents, the characteristics of a dangerous location must depend on the memory of local residents, and thus sites different from the sites at which actually having sensed danger may also be specified as a dangerous location, and thus it has not been possible to accurately exploit the valuable knowledge of local residents.

Therefore, the present invention has an object of enabling the collection of risk information from the perspective of users utilizing various transportation means.

Means for Solving the Problems

According to a first aspect of the present invention, in a map provision server (e.g., the map provision server 1 described later) that provides a map (e.g., the electronic map 30 described later) enabling posting of risk information relating to road traffic, the server includes: a data acquisition unit (e.g., the data acquisition unit 11 described later) that acquires driving information (e.g., the FCD (Floating Car Data) described later) including occurrences of sudden braking and occurrence sites of the sudden braking from a plurality of vehicles (e.g., the vehicle 20 described later); a risk information storage unit (e.g., the risk information DB 14 described later) that stores, to be associated, sudden braking information having occurred for each of the occurrence sites of the sudden braking, based on the driving information acquired by the data acquisition unit; and a map generation unit (e.g., the map generation unit 12 described later) that generates a map showing a dangerous location, and provides to a user, in which the map generation unit includes: a dangerous location specification unit (e.g., the dangerous location specification unit 121 described later) that specifies as the dangerous location (e.g., the dangerous location 41 described later) an occurrence site of sudden braking based on the sudden braking information; and a posting column generation unit (e.g., the posting column generation unit 122 described later) that arranges the dangerous location on a map, and generates a posting column (e.g., the posting column 60 described later) capable of accepting a posting from a user to be associated with the dangerous location thus arranged.

According to the map provision server of the first aspect, a dangerous location at which sudden braking repeatedly occurs is specified based on driving information acquired from vehicles, this dangerous location is arranged on the map requested from the user, as well as the posting column capable of accepting the postings from users in relation to the dangerous locations being generated. A map in which the posting column is established in relation to the dangerous location is thereby provided.

As a result thereof, a user that posts a dangerous personal experience can specify a site at which having actually sensed danger from among the dangerous locations arranged on the map, without blindly searching for any site on the route. Since posting is thereby facilitated, proactive postings from users can be expected, and it is possible to collect risk information from the perspective of users utilizing various transportation means not limited to the vehicle.

According to a second aspect of the present invention, in the map provision server as described in the first aspect, based on a number of sampled vehicles within a fixed time period, the sudden braking information uses sudden braking frequency in a case of a number of sampled vehicles being large, and uses a number of times of sudden braking in a case of the number of sampled vehicles being small.

According to the map provision server of the second aspect, it is possible to accurately reflect the degree of risk for the main road, and reliably reflect the risk that is difficult to actualize for the route having little traffic volume.

According to a third aspect of the present invention, the map provision server as described in the first or second aspect further includes: an information update unit (e.g., the information update unit 13 described later) that accepts a posting related to the dangerous location from a user via the posting column, and stores posting contents thus accepted in the risk information storage unit to be associated with the dangerous location.

According to the map provision server of the third aspect, the posting contents accepted from a user via the posting column are stored to be associated with a dangerous location; therefore, it is possible to appropriately use the posting contents accepted from users.

According to a fourth aspect of the present invention, in the map provision server as described in the third aspect, the map generation unit further includes: a posting contents addition unit (e.g., the posting contents addition unit 123 described later) that adds the posting contents associated with the dangerous location to be displayable.

According to the map provision server of the fourth aspect, the posting contents accepted from a user come to be displayed along with the map; therefore, it is possible to display the dangerous personal experiences by other users on the map, whereby traffic safety can be educated.

According to a fifth aspect of the present invention, in the map provision server as described in the fourth aspect, the information update unit accepts the posting in conjunction with a transportation means of a user posting, and stores posting contents thus accepted and the transportation means in the risk information storage unit to be associated with the dangerous location; and the posting contents addition unit, according to a request designating the transportation means from a user requesting a map, adds only posting contents corresponding to the transportation means identified at the dangerous location to be displayable.

According to the map provision server of the fifth aspect, since it is made possible to display only posting contents corresponding to a designated transportation means according to the request designating the transportation means from the user, posting contents that are unnecessary for the user will not be displayed, whereby convenience can be raised.

According to a sixth aspect of the present invention, in the map provision server as described in the fourth or fifth aspect, the posting column at least includes a posting item of selectable format; and the posting contents addition unit displays posting contents having a large number of selections (e.g., the majority positing 42 described later) on the map.

According to the map provision server of the sixth aspect, the posting contents having a large number of selections for a posting item of selectable format are displayed on the map. It is thereby possible to display exemplary posting contents from users on the map, whereby convenience can be raised. In addition, by displaying only posting contents having a large number of selections, it is possible to prevent posting contents from being redundantly displayed even if the postings of users increased, and thus the visibility of the map and posting contents can be raised.

According to a seventh aspect of the present invention, in the map provision server as described in any one of the first to sixth aspects, the data acquisition unit acquires driving information including time; the risk information storage unit stores in conjunction with the time to be associated with the occurrence site of the sudden braking; and the dangerous location specification unit, according to a request designating a time slot from a user, specifies an occurrence site of sudden braking as a dangerous location based on the sudden braking information corresponding to a time slot requested.

According to the map provision server of the seventh aspect, a dangerous location is specified based on the number of times of sudden braking corresponding to a time slot designated from the user. Since dangerous locations corresponding to a time slot designated by the user are thereby arranged on the map, a user posting a dangerous personal experience easily understands the dangerous locations according to the time slot in which having experienced danger oneself.

According to an eighth aspect of the present invention, in the map provision server as described in any one of the first to seventh aspects, the data acquisition unit acquires driving information including a weather condition during driving; the risk information storage unit stores in conjunction with the weather condition to be associated with the occurrence site of the sudden braking; and the dangerous location specification unit, according to a request designating weather from a user, specifies an occurrence site of sudden braking as a dangerous location based on the sudden braking information corresponding to a weather condition requested.

According to the map provision server of the eighth aspect, a dangerous location is specified based on sudden braking information corresponding to the weather designated from the user. Since dangerous locations corresponding to the weather designated by the user are thereby arranged on the map, a user posting a dangerous personal experience easily understands the dangerous locations according to the weather in which having experienced danger oneself.

According to a ninth aspect of the present invention, in the map provision server as described in any one of the first to eighth aspects, the dangerous location specification unit specifies the dangerous location using a different judgment threshold according to a magnification of a map requested from a user.

According to the map provision server of the ninth aspect, upon specification of dangerous locations, since different judgment thresholds are used depending on the magnification of the map requested from the user, the dangerous locations arranged on the map switch in response to a change in magnification, whereby convenience can be raised.

According to a tenth aspect of the present invention, in a map provision method of providing a map (e.g., the electronic map 30 described later) that enables posting of risk information relating to road traffic, the method is executed by a computer (e.g., the map provision server 1 described later) and includes the steps of: acquiring driving information (e.g., the FCD (Floating Car Data) described later) including occurrences of sudden braking and occurrence sites of the sudden braking from a plurality of vehicles (e.g., the vehicle 20 described later); storing, to be associated, sudden braking information having occurred for each of the occurrence sites of the sudden braking, based on the driving information acquired in the step of acquiring; specifying an occurrence site of sudden braking as a dangerous location (e.g., the dangerous location 41 described later) based on the sudden braking information; arranging, according to a request from a user, the dangerous location on a map according to a request, and generating a posting column (e.g., the posting column 60 described later) capable of accepting a posting from a user to be associated with the dangerous location thus arranged; and providing a map including the posting column to the user.

According to an eleventh aspect of the present invention, in the map provision method as described in the tenth aspect, the step of specifying specifies, based on a number of sampled vehicles within a fixed time period, by using sudden braking frequency as the sudden braking information in a case of a number of sampled vehicles being large, and by using a number of times of sudden braking as the sudden braking information in a case of the number of sampled vehicles being small.

According to a twelfth aspect of the present invention, the map provision method as described in the tenth or eleventh aspect further includes a step of accepting a posting in relation to the dangerous location from a user via the posting column, and storing posting contents thus accepted to be associated with the dangerous location.

According to a thirteenth aspect of the present invention, the map provision method as described in the twelfth aspect further includes a step of adding the posting contents associated with the dangerous location to be displayable.

According to a fourteenth aspect of the present invention, in the map provision method as described in the thirteenth aspect, the step of accepting accepts the posting in conjunction with a transportation means of the user that posts, and stores the posting contents accepted and the transportation means to be associated with the dangerous location; and the step of adding adds, according to a request designating the transportation means from the user requesting a map, only posting contents corresponding to the transportation means identified at the dangerous location to be displayable.

According to a fifteenth aspect of the present invention, in the map provision method as described in the thirteenth or fourteenth aspect, the posting column at least includes a posting item of selectable format; and the step of adding displays posting contents having a large number of selections (e.g., the majority posting 42 described later) on the map.

According to a sixteenth aspect of the present invention, in the map provision method as described in any one of the tenth to fifteenth aspects, the step of acquiring acquires driving information including time; the step of storing stores in conjunction with the time to be associated with the occurrence site of the sudden braking; and the step of specifying, according to a request designating a time slot from a user, specifies an occurrence site of sudden braking as a dangerous location based on the sudden braking information corresponding to the time slot requested.

According to a seventeenth aspect of the present invention, in the map provision method as described in any one of the tenth to sixteenth aspects, the step of acquiring acquires driving information including a weather condition during driving; the step of storing stores in conjunction with the weather condition to be associated with the occurrence site of the sudden braking; and the step of specifying, according to a request designating a weather condition from a user, specifies an occurrence site of sudden braking as a dangerous location based on the sudden braking information corresponding to the weather condition requested.

According to an eighteenth aspect of the present invention, in the map provision method as described in any one of the tenth to seventeenth aspects, the step of specifying specifies the dangerous location using a different judgment threshold according to a magnification of a map requested from a user.

Similar effects to the map provision server of the first to ninth aspects are exerted by the map provision methods of the tenth to eighteenth aspects.

Effects of the Invention

According to the present invention, it is possible to collect risk information from the perspective of users utilizing various transportation means.

BRIEF DESCRIPTION OF THE DRAWINGS

FIG. 2A is a view showing the configuration of an FCD storage region of a risk information DB;

FIG. 2B is a view showing the configuration of a traffic accident information storage region of the risk information DB;

FIG. 2C is a view showing the configuration of a posting contents storage region of the risk information DB;

FIG. 4 is a view showing a posting column provided to the user terminal from the map provision server.

PREFERRED MODE FOR CARRYING OUT THE INVENTION (Configuration of Map Provision System 5)

Figure 1:
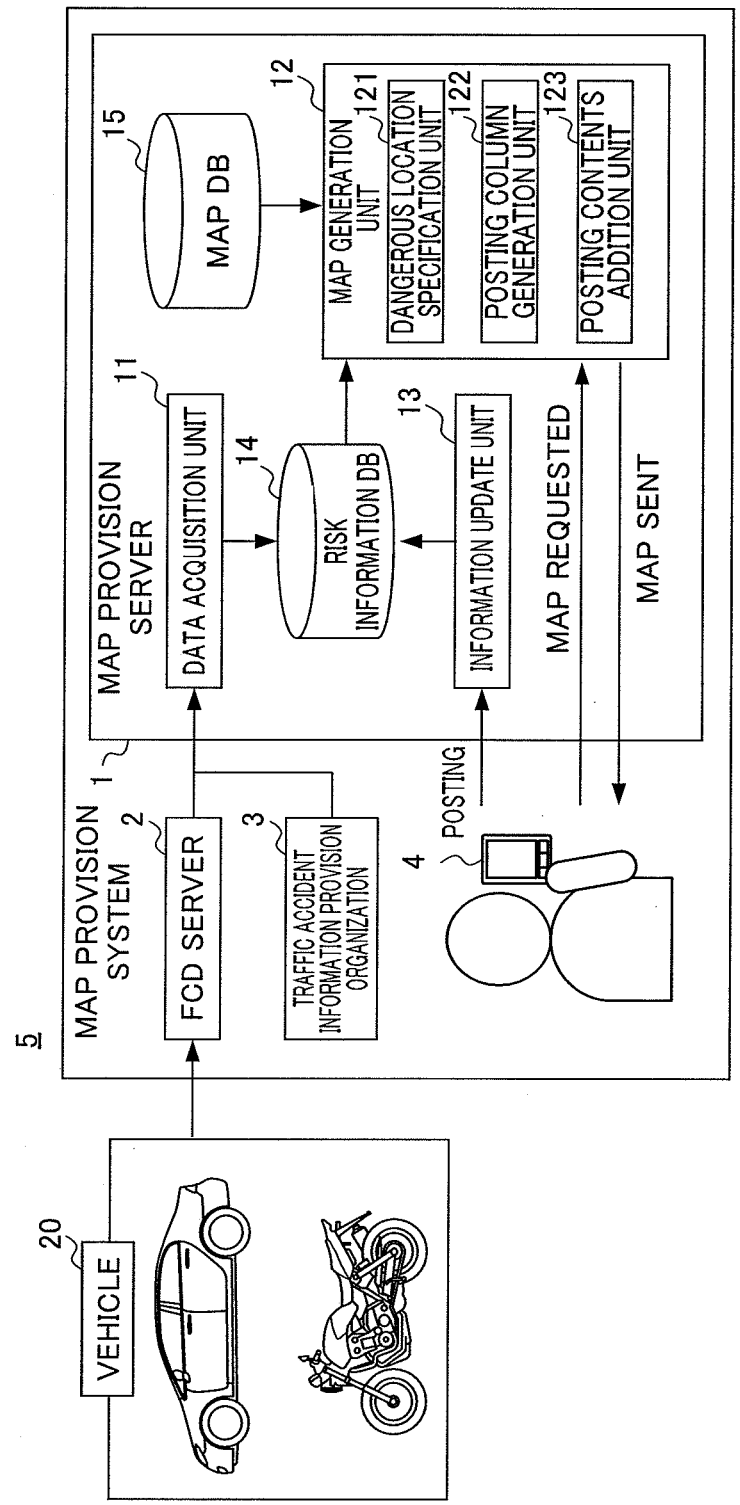
FIG. 1 is a view showing the configuration of a map provision system including a map provision server of the present invention.

First, a map provision system 5 including a map provision server 1 of the present invention will be explained by referencing FIG. 1. FIG. 1 is a block diagram showing a functional configuration of the map provision system 5.

The map provision system 5 is configured to include a map provision server 1, FCD server 2, traffic accident information provision organization 3, and a user terminal 4.

The FCD server 2 collects and stores FCD (floating car data) from vehicles 20.

Herein, the vehicle 20 is an automobile, motorcycle, etc., and measures driving information of the vehicle using various built-in sensors. For example, the vehicle 20 measures the current time and the latitude and longitude of the current position by way of GPS (Global Positioning System), measures the acceleration-deceleration of the vehicle by way of an acceleration sensor, and measures whether or not in a rainfall state by a raindrop sensor or the operation condition of the windshield wipers. The vehicle 20 sends these measurement results (FCD) to the FCD server 2 by way of wireless communication.

The FCD server 2 is communicably connected with the map provision server 1, stores the FCD acquired from the vehicle 20 upon processing as necessary, and sends the stored FCD to the map provision server 1 at a predetermined timing.

The traffic accident information provision organization 3 is an organization such as a police station tallying traffic accidents. The traffic accident information provision organization 3 provides information related to traffic accident repeat occurrence areas to the map provision server 1 by way of data communication via a communication network, or the forwarding of a storage medium storing the information.

The user terminal 4 is an information processing device to be used by the user utilizing the electronic map, and is communicably connected with the map provision server 1.

(Configuration of Map Provision Server 1)

The map provision server 1 is a server device including a control unit and storage unit, and exhibits various functions as a data acquisition unit 11, map generation unit 12 and information update unit 13 by executing a predetermined program. In addition, a risk information DB 14 and map DB 15 are provided in the storage unit of the map provision server 1.

The data acquisition unit 11 acquires the aforementioned FCD from the FCD server 2, and stores in the risk information DB 14. It should be noted that the FCD, which is the measurement results, is preferably stored in the risk information DB 14 upon performing the appropriate processing. It may be configured so that such processing is performed by the data acquisition unit 11, or it may be configured to be performed by the FCD server 2. In other words, it may be configured so that the data acquisition unit 11 acquires not the measurement result itself, but rather the processed data arrived at by processing measurement results from the FCD server 2.

In the information utilized in the present embodiment, at least the occurrences places of sudden braking are included, and as necessary, the occurrence time of sudden braking, the weather at the time of sudden braking occurrence (whether or not being rainfall conditions), the type of the vehicle 20 such as whether being an automobile or motorcycle, total number of vehicles 20 passing through the occurrence site of sudden braking occurs, etc. are included. The data acquisition unit 11, upon processing the FCD acquired from the FCD server 2 to generate this information, or upon acquiring this information from the FCD server 2, stores this information in the risk information DB 14.

In addition, the data acquisition unit 11 acquires information related to traffic accident common occurrence areas from the traffic accident information provision organization 3, and stores in the risk information DB 14.

The map generation unit 12 generates an electronic map on which dangerous locations for traffic are arranged according to a request from the user terminal 4, and sends to the user terminal 4. At this time, it is configured so that the map generation unit 12 generates and sends an electronic map on which a user can post their own personal experience concerning the arranged dangerous locations.

Therefore, the map generation unit 12 is configured to include a dangerous location specification unit 121, posting column generation unit 122, and posting contents addition unit 123.

The dangerous location specification unit 121 references the risk information DB 14 and specifies as a dangerous location to be associated with sudden braking information for every sudden braking occurrence site. The sudden braking information specifies dangerous locations based on the number of times of occurrence or the occurrence frequency of sudden braking. More specifically, the dangerous location specification unit 121 specifies a sudden braking occurrence site for which the number of times of occurrence of sudden braking is at least a predetermined number as a dangerous location. Alternatively, the dangerous location specification unit 121 may be configured to specify a dangerous location based on the occurrence frequency of sudden braking. In other words, the dangerous location specification unit 121 may be configured to specify a sudden braking occurrence site for which the frequency of sudden braking calculated by dividing the number of times of occurrence of sudden braking by the total number (number of sampled vehicles) of the vehicles 20 passing therethrough is at least a predetermined frequency, as a dangerous location. It is possible to select either to use the number of times of occurrence or to use the occurrence frequency as the sudden braking information, and to properly use a selection depending on the traffic volume. For example, by using the sudden braking frequency for a main road having at least a certain traffic volume, and using the number of times of sudden braking for a route having little traffic volume, the degree of risk can be accurately reflected for the main road, and the risk that is difficult to actualize can be reliably reflected for the route having little traffic volume.

In addition, the dangerous location specification unit 121 may be configured to specify a dangerous location by time slot distinction or weather distinction. It is thereby possible to specify a dangerous location according to predetermined conditions such as sudden braking tending to occur in a school commuting (work commuting) time slots, and sudden braking tending to occur during rainy weather.

In addition, the dangerous location specification unit 121 may be configured to make the threshold (predetermined number of times or predetermined frequency) for specifying as a dangerous location differ according to the magnification of the map requested from the user terminal 4.

The posting column generation unit 122 arranges (plots) dangerous locations specified by the dangerous location specification unit 121 on the electronic map requested from the user terminal 4. Herein, the dangerous locations arranged on the electronic map are dangerous locations (sudden braking repeat occurrence locations) specified by the dangerous location specification unit 121; therefore, in the case of specifying dangerous locations by time slot distinction or weather distinction as mentioned above, the dangerous locations arranged on the electronic map will come to differ (sorting of dangerous locations).

In addition, the posting column generation unit 122 generates a posting column that can accept postings from users to be associated with each of the arranged dangerous locations. At this time, the posting column generation unit 122 enables acceptance of postings relating to a dangerous location according to a selection from the user, by generating a posting column that at least includes posting items of selectable format.

The posting contents addition unit 123 adds, to the electronic map on which a dangerous locations is arranged, the posting contents from a user related to the dangerous location to be displayable. In other words, the posting contents addition unit 123 reads posting contents already accepted from (another) user via the posting column from the risk information DB 14, and adds to be displayable associated with the dangerous location corresponding to the posting column having accepted the posting.

In addition, the posting contents addition unit 123 adds only the posting contents according to the designated conditions to be displayable on the electronic map (sorting of posting contents), when accepting a request designating the transportation means, time slot or weather from the user terminal 4. As one example, in the case of the transportation means "bicycle" being designated from the user terminal 4, the posting contents addition unit 123 adds only posting contents posted by another user utilizing a bicycle. Similarly, in the case of the time slot "school commute (work commute) time slot" being designated from the user terminal 4, the posting contents addition unit 123 adds only the posting contents of other users corresponding to the school commute (work commute) time slot to be displayable on the electronic map.

The information update unit 13 accepts postings from users related to dangerous locations via the posting column, and stores the accepted posting contents in the risk information DB 14 to be associated with a dangerous location corresponding to the posting column. In the present embodiment, the information update unit 13 accepts the danger sensed by a user at a dangerous location, transportation means of the user when sensing danger, time when sensing danger, etc. as the posting contents.

Next, the risk information DB 14 will be explained by referencing FIG. 2. FIG. 2A, FIG. 2B, and FIG. 2C are views showing outlines of the risk information DB 14. To facilitate understanding, the risk information DB 14 of the present embodiment is configured to include an FCD storage region (FIG. 2A), traffic accident information storage region (FIG. 2B), and posting contents storage region (FIG. 2C).

The FCD storage region is a region storing the FCD acquired by the data acquisition unit 11 from the FCD server 2, and stores information in which the dangerous location specification unit 121 can specify a dangerous location. As one example, the FCD storage region stores the number of times sudden braking has occurred or the total number of vehicles 20 having passed through this sudden braking occurrence site to be associated with the sudden braking occurrence site, as shown in FIG. 2A. In addition, it may be configured to store the time when sudden braking occurs, with/without of windshield wiper operation or measurement results of a raindrop sensor, etc. to be associated with the sudden braking occurrence site.

The dangerous location specification unit 121 specifies a dangerous location having particular danger (i.e. location of sudden braking repeated occurrence) among the sudden braking occurrence sites based on the information stored in the FCD storage region, and the posting column generation unit 122 generates a posting column to be associated with the specified dangerous location.

As shown in FIG. 2B, the traffic accident information storage region stores traffic information such as information related to a traffic accident repeat occurrence area, or information related to a region in which the speed limit is a speed of 30 km (so-called "zone 30"). It may be configured so that this traffic information is acquired by the data acquisition unit 11 from an organization such as the traffic accident information provision organization 3, and may be configured to be input from an operator as necessary.

The posting contents storage region is a region that stores the posting contents accepted by the information update unit 13 from the user terminal 4, and stores the posting contents of the user to be associated with a dangerous location as shown in FIG. 2C. The dangerous location of the posting contents storage region and the sudden braking occurrence site of the FCD storage region are associated, whereby it becomes possible to display the posting contents to be associated with the occurrence site of sudden braking. In other words, if a dangerous location (sudden braking repeated occurrence location among sudden braking occurrence sites) is arranged on the electronic map, the posting contents addition unit 123 reads the posting contents corresponding to the arranged dangerous location, and adds the posting contents from the user related to this dangerous location to be displayable.

Referring back to FIG. 1, the map DB 15 stores electronic maps. If the request for a map is accepted from the user terminal 4, the map generation unit 12 reads an electronic map stored in the map DB 15, and provides this electronic map to the user terminal 4 upon arranging dangerous locations, etc. thereon.

It should be noted that, in the case of receiving the provision of an electronic map from an electronic map provider or the like, it is not necessary to provide the map DB 15 to the map provision server 1. In other words, the map DB 15 does not necessarily need to be provided to the map provision server 1 so long as the map generation unit 12 is accessible.

(Operation of Map Provision Server 1)

Figure 3:
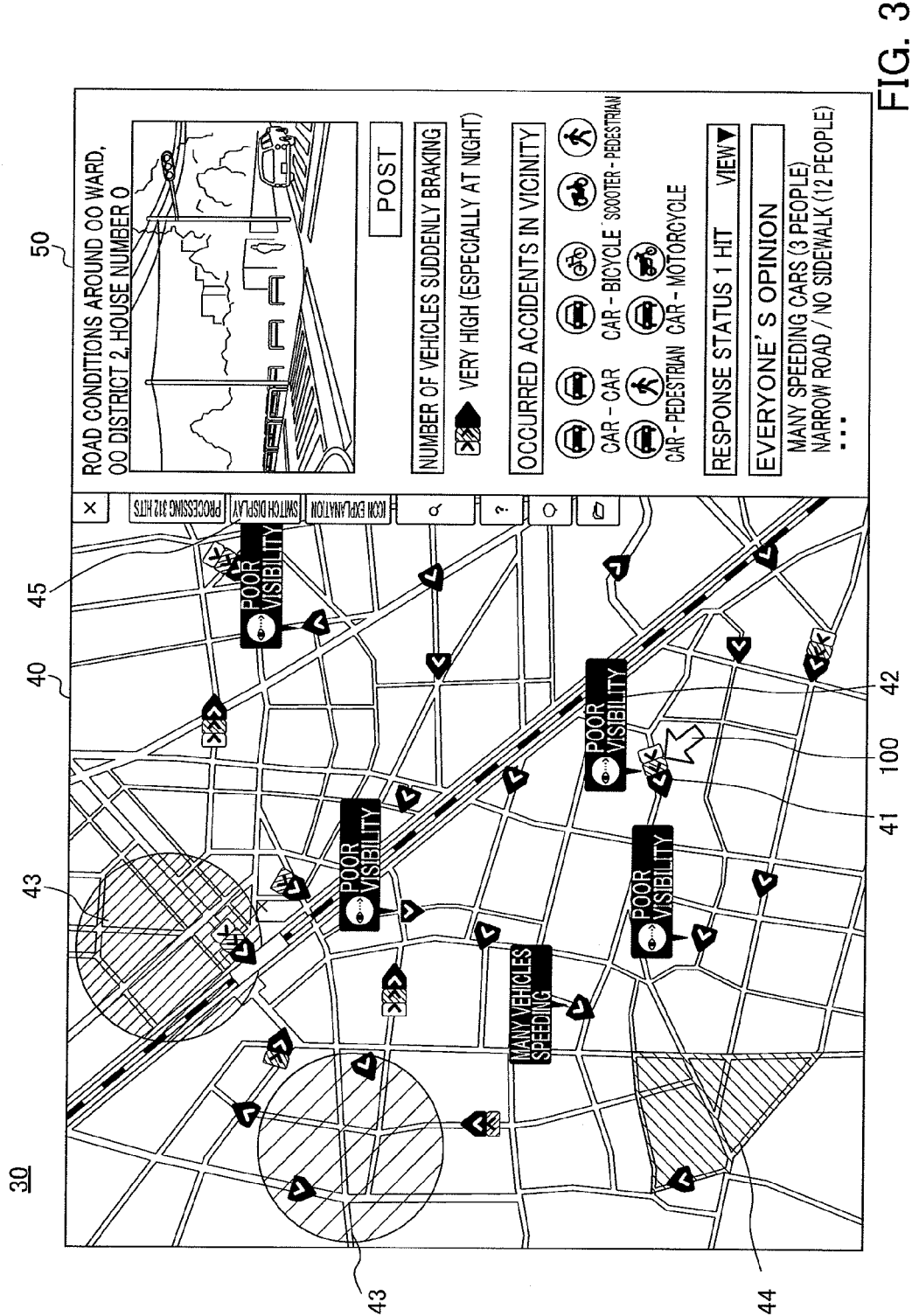
FIG. 3 is a view showing an electronic map provided to a user terminal from the map provision server.
Figure 5:
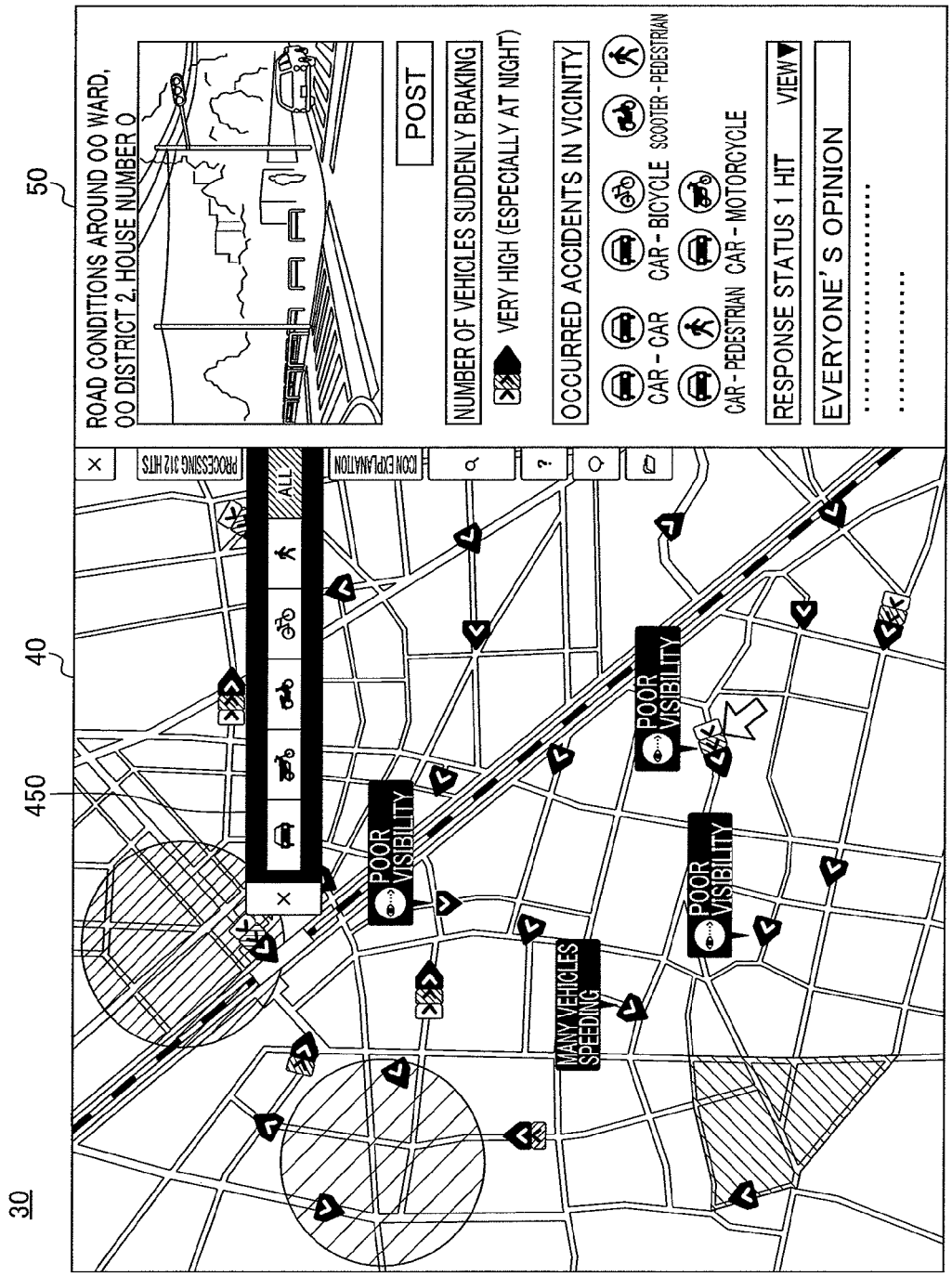
FIG. 5 is a view showing an electronic map provided to the user terminal from the map provision server.

The configuration of a map provision system including the map provision server 1 of the present invention has been explained in the foregoing. Next, the operation of the map provision server 1 will be explained using a display example of an electronic map provided by the map provision server 1. FIGS. 3 to 5 are views showing display examples of electronic maps provided from the map provision server 1.

Referring to FIG. 3, the electronic map 30 provided to the user terminal 4 from the map provision server 1 is configured to include the map display region 40 and the posting contents display region 50.

The map display region 40 displays a map of the range requested from the user terminal 4. On the map displayed in the map display region 40, a dangerous location 41, a majority posting 42, a traffic accident repeat occurrence area 43, a zone-30 area 44, and a display switching tab 45 are included.

The dangerous location 41 indicates a site having a high number of times of occurrence or occurrence frequency of sudden braking among the sudden braking occurrence sites. This dangerous location 41 is displayed in a different form according to the number of times of occurrence or occurrence frequency of sudden braking. In the present embodiment, it is configured so as to indicate the number of times of occurrence or occurrence frequency of sudden braking by way of the number of arrows. In other words, a dangerous location 41 having one arrow indicates having the smallest number of times of occurrence or occurrence frequency, a dangerous location 41 having two arrows indicates having the next smallest number of times of occurrence or occurrence frequency, and a dangerous location 41 having three arrows indicates having the greatest number of times of occurrence or occurrence frequency.

The majority posting 42 displays the contents having the greatest number of postings, among the postings of users concerning a dangerous location 41. In the present embodiment, it is configured to accept postings of selectable format from users, and the posting contents having the greatest number of selections are displayed in the majority posting 42.

The traffic accident repeat occurrence area 43 indicates a region in which traffic accidents repeatedly occur. It should be noted that it may be configured so that the traffic accident repeat occurrence area 43 displays in different forms depending on the number of times of occurrence or the occurrence frequency of traffic accidents.

The zone-30 area 44 indicates a region in which the speed limit is a speed of 30 km.

The display switching tab 45 is an operation part for performing switching (sorting) of the display, and will be described in detail later.

The posting contents display region 50 displays the details of postings of users concerning a dangerous location 41. More specifically, the posting contents display region 50 displays the details of postings of users corresponding to a dangerous location 41 selected by a cursor 100 (mouse-on) in the map displayed in the map display region 40.

In this posting contents display region 50, in addition to the detailed information of a sudden braking number (frequency) for a dangerous location 41, the details of postings concerning this dangerous location 41, traffic information for the surroundings of this dangerous location 41 (e.g., accidents having occurred in the surroundings, response status such as traffic signal installation) are displayed. A posting button is displayed in the posting contents display region 50, and a posting to a corresponding dangerous location 41 becomes possible by being operated (clicked) by the user.

Next, a display example of a posting column 60 accepting the posting of a user is shown in FIG. 4. In the present embodiment, the posting column 60 is provided to the user terminal 4 from the map provision server 1 by a posting button of the posting contents display region 50 being operated (clicked), or by a dangerous location 41 in the map display region 40 being operated (clicked).

It should be noted that it may be configured so that the posting column 60 is provided within the posting contents display region 50, rather than providing the posting column 60 separately from the posting contents display region 50.

The posting column 60 at least includes the posting item 61 of selectable format. In the present embodiment, as the posting item 61 of selectable format, it is configured to use the type of danger sensed by the user, transportation means of the user when sensing danger, time when sensing danger, weather when sensing danger, etc. It should be noted that contents with the greatest selection number among the postings accepted with the posting item 61 "type of danger sensed by user" come to be displayed on the map as the majority posting 42. In addition, switching (sorting) of the display described later comes to be performed using the posting item 61 "transportation means of user when sensing danger", "time when sensing danger", and "weather when sensing danger".

In addition, the post button 62 is provided to the posting column 60, and posting via the posting column 60 comes to be performed by this post button being operated (clicked).

The electronic map 30 shown in FIG. 3 and the posting column 60 shown in FIG. 4 are generated by the map provision server 1, and are provided to the user terminal 4.

More specifically, when accepting a request for an electronic map from the user terminal 4, the dangerous location specification unit 121 of the map generation unit 12 specifies a dangerous location 41 at which sudden braking repeatedly occurs from among the sudden braking occurrence sites included in the requested range. When the dangerous location specification unit 121 specifies a dangerous location 41, the posting column generation unit 122 arranges a specified dangerous location 41 on the requested electronic map.

Next, the posting contents addition unit 123 acquires posting contents having the greatest number of postings among the posting contents that were posted in relation to the dangerous location 41 from the risk information DB 14, and arranges these posting contents on the electronic map to be associated with the dangerous location 41 as the majority posting 42. In addition, the posting contents addition unit 123 acquires postings of users concerning the dangerous location 41 and traffic information of the surroundings of the dangerous location 41 from the risk information DB 14, and adds to the electronic map 30, as is displayed in the posting contents display region 50 by the dangerous location 41 being selected (on-mouse).

In addition, the posting column generation unit 122 generates the posting column 60 including the posting item 61 of selectable format to be associated with the dangerous location 41. As one example, the posting column generation unit 122 associates the posting column 60 and a dangerous location 41 by making a configuration in which the posting column 60 is displayed by the dangerous location 41 being selected (clicked).

According to such operation of the map provision server 1, the electronic map 30 shown in FIG. 3 and the posting column 60 shown in FIG. 4 are generated, and come to be provided to the user terminal 4.

In addition, as shown in FIG. 5, it is possible to switch the display using the display switching tab 45 in the electronic map 30. In FIG. 5, transportation means sorting 450 is displayed by the display switching tab 45 being selected (clicked). When any transportation means is selected from the transportation means sorting 450, the information being displayed on the electronic map 30 is switched. It should be noted that, although illustration is being omitted, it may be configured to provide an operation part such as for time slot sorting to switch the display based on the time slot, and weather sorting to switch the display based on the weather, in addition to the transportation means sorting 450.

Regarding the switching of such display, in the present embodiment, it is configured to perform "sorting of dangerous locations" to switch the dangerous locations 41 arranged on the electronic map 30, and "sorting of posting contents" to switch the posting contents that were posted in relation to the dangerous location 41.

Sorting of dangerous locations can be performed based on the occurrence time of sudden braking, and weather during sudden braking occurrence (whether or not being rainfall conditions), which are acquired as FCD. For example, when the user designates a predetermined time slot, the dangerous location specification unit 121 specifies a sudden braking occurrence site at which sudden braking repeatedly occurs in this time slot as the dangerous location 41, and this dangerous location 41 is arranged on the electronic map 30.

According to such sorting of dangerous locations, since the dangerous locations 41 arranged on the electronic map 30 come to switch according to the designation of the user, it is easy to specify the dangerous locations 41 for a user posting their own personal dangerous experience in relation to the dangerous location 41, which is ideal.

The sorting of the posting contents can be performed based on the transportation means of the user when sensing danger, the time when sensing danger, and the weather when sensing danger accepted as posting contents. For example, when the user designates a predetermined transportation means, the posting contents addition unit 123 adds only the postings contents of users having selected the same transportation means as this transportation means to be displayable on the electronic map 30.

According to such sorting of posting contents, since the contents displayed in the majority posting 42 or detailed posting 52 come to switch according to the designation of the user, for a user desiring the reading of the dangerous personal experiences of other users, it is possible to grasp only the dangerous personal experiences for conditions closely resembling one's own, which is ideal.

It should be noted that it may be configured so that this sorting of dangerous locations and sorting of posting contents are performed each individually, and it may be configured to be performed in combination. In addition, the information for performing sorting of dangerous locations and sorting of posting contents are not limited to the aforementioned, and it may be configured to perform sorting of dangerous locations and sorting of posting contents using other information.

The following such effects are exerted according to the map provision server 1 explained above.

(1) The dangerous location specification unit 121 of the map provision server 1 specifies a dangerous location 41 at which sudden braking repeatedly occurs based on FCD acquired from vehicles 20, and the posting column generation unit 122 arranges this dangerous location 41 on the electronic map 30 requested from the user, and generates the posting column 60 capable of accepting the postings from users in relation to the dangerous locations 41. The electronic map 30 in which the posting column 60 is established in relation to the dangerous location 41 is thereby provided.

In this regard, the matter of accepting a posting from a user via the electronic map has been performed conventionally, for example, in sightseeing maps, gourmet maps, etc. However, postings are performed with sightseeing areas, restaurants, etc. as the targets in the sightseeing maps, gourmet maps, etc., and both the user and map provider could understand the posting targets in advance. In contrast, the dangers in road traffic have a possibility of occurring at any site on the route, and it has been difficult for the user and map provider to understand the posting targets in advance.

In this point, the map provision server 1 assumes the dangerous location 41 at which sudden braking repeatedly occurs as the site that is a road traffic danger, and establishes the posting column 60 to enable posting in relation to this dangerous location 41. As a result thereof, a user that posts a dangerous personal experience can specify a site at which having actually sensed danger with the dangerous locations 41 as references, without blindly searching for any site on the route. Since posting is thereby facilitated, proactive postings from users can be expected, and it is possible to collect risk information from the perspective of users utilizing various transportation means not limited to the vehicle 20.

(2) The dangerous location specification unit 121 of the map provision server 1, based on the sampled number of vehicles 20 within a fixed time period, specifies risk information using sudden braking frequency in the case of the number of sampled vehicles being great, and specifies risk information using the number of times of sudden braking in the case of the number of sampled vehicles being few. It is thereby possible to accurately reflect the degree of risk at a route having a large traffic volume such as a main road, and to reliably reflect the risk that is difficult to actualize for a route having little traffic volume.

(3) The information update unit 13 of the map provision server 1 stores the posting contents accepted from a user via the posting column 60 in the risk information DB 14 to be associated with the dangerous location 41. It is thereby possible to appropriately employ the posting contents accepted from a user.

(4) The posting contents display region 50 is provided to the electronic map 30, and the posting contents addition unit 123 of the map provision server 1 adds the posting contents accepted from a user to the posting contents display region 50 to be displayable. It is thereby possible to display the danger personal experiences of other users in conjunction with the electronic map 30, whereby traffic safety can be educated.

(5) At this time, the posting contents addition unit 123 of the map provision server 1 adds only the posting contents corresponding to a transportation means designated, according to a request designating the transportation means from the user. Posting contents that are unnecessary for the user are thereby not displayed, whereby the convenience can be raised.

(6) At least the posting items 61 of selectable format is included in the posting column 60, and the posting contents addition unit 123 of the map provision server 1 displays the posting contents having a large number of selections for the posting items 61 on the map as the majority posting 42. The outline of posting contents can thereby be understood from only the map, while the posting contents display region 50 may be used in the case of desiring details, and thus the convenience can be raised. In addition, since only posting contents having a large number of selections are displayed as the majority posting 42, it is possible to prevent posting contents being redundantly displayed even if the postings of users increased, and thus the visibility of the map and posting contents can be raised.

(7) The dangerous location specification unit 121 of the map provision server 1 specifies a dangerous location 41 based on the number of times of sudden braking in a requested time slot, according to a request designating a time slot from the user. The dangerous locations 41 displayed on the electronic map 30 thereby come to switch, and the user easily understands the dangerous locations 41 according to time slot in which having experienced danger oneself.

(8) The dangerous location specification unit 121 of the map provision server 1 specifies a dangerous location 41 based on the number of times of sudden braking corresponding to the requested weather, according to a request designating the weather from a user. The dangerous locations 41 displayed on the electronic map 30 thereby come to switch, and the user easily understands the dangerous locations 41 according to the weather in which having experienced danger oneself.

(9) The dangerous location specification unit 121 of the map provision server 1 specifies a dangerous location 41 using different judgment thresholds according to the magnification of the map requested from the user. The dangerous locations 41 displayed on the electronic map 30 thereby come to switch in response to a change in magnification, whereby the convenience can be raised.

Although preferred embodiments of the present invention have been explained in the foregoing, the present invention is not to be limited to the aforementioned embodiments, and modifications thereof are possible as appropriate.

Although the present embodiment configures so as to display the posting contents relating to the type of danger sensed by the user as the majority posting 42, the posting contents displayed as the majority posting 42 are not limited thereto, and can be arbitrarily set so long as being posting contents for a posting item of selectable format. In addition, in the case of there being a plurality of posting items of selectable format, it may be configured to be switchable between posting contents displayed as the majority posting 42.

EXPLANATION OF REFERENCE NUMERALS

1 map provision server
11 data acquisition unit
12 map generation unit
121 dangerous location specification unit
122 posting column generation unit
123 posting contents addition unit
13 information update unit
14 risk information DB
15 map DB
2 FCD server
20 vehicle
3 traffic accident information provision organization
4 user terminal
5 map provision system

The invention claimed is:

1. A map provision server that provides a map enabling posting of risk information relating to road traffic, the server comprising:
 a processor;
 memory that stores a program code executable by the processor; and
 a storage device,
 wherein the processor, by executing the program code, is configured to comprise:
  a data acquisition unit that acquires driving information including occurrences of sudden braking and occurrence sites of the sudden braking from a plurality of vehicles;

a risk information storage unit that stores, to be associated, sudden braking information for determining a sudden braking repeated occurrence situation that is calculated based on a number of sudden braking occurrences having occurred for each of the occurrence sites of the sudden braking, based on the driving information acquired by the data acquisition unit; and a map generation unit that generates a map showing a dangerous location, and provides via a user terminal to a user, wherein the map generation unit includes:

a dangerous location specification unit that specifies as the dangerous location an occurrence site of sudden braking based on the sudden braking information; and a posting column generation unit that arranges the dangerous location on a map, and generates a posting column capable of accepting a posting from a user to be associated with the dangerous location thus arranged, in conjunction with a transportation means of the user.

2. The map provision server according to claim 1, wherein, based on a number of sampled vehicles within a fixed time period, the sudden braking information uses sudden braking frequency calculated by dividing the number of sudden braking occurrences by a number of sampled vehicles in a case of the number of sampled vehicles being large, and uses a number of sudden braking occurrences in a case of the number of sampled vehicles being small.

3. The map provision server according to claim 1, wherein the processor, by executing the program code, is further configured to comprise:

an information update unit that accepts a posting related to the dangerous location from the user terminal via the posting column in conjunction with the transportation means of the user, and stores posting contents thus accepted and the transportation means in the risk information storage unit to be associated with the dangerous location.

4. The map provision server according to claim 3, wherein the map generation unit further includes:

a posting contents addition unit that adds the posting contents and the transportation means associated with the dangerous location to be displayable.

5. The map provision server according to claim 4, wherein the posting contents addition unit, according to a request designating the transportation means from the user terminal requesting a map, adds only posting contents corresponding to the transportation means identified at the dangerous location to be displayable.

6. The map provision server according to claim 4, wherein the posting column at least includes a posting item of selectable format, and wherein the posting contents addition unit displays posting contents having a large number of selections on the map.

7. The map provision server according to claim 1, wherein the data acquisition unit acquires driving information including time, wherein the risk information storage unit stores in conjunction with the time to be associated with the occurrence site of the sudden braking, and wherein the dangerous location specification unit, according to a request designating a time slot from the user terminal, specifies an occurrence site of sudden braking as a dangerous location based on the sudden braking information corresponding to a time slot requested.

8. The map provision server according to claim 1, wherein the data acquisition unit acquires driving information including a weather condition during driving, wherein the risk information storage unit stores in conjunction with the weather condition to be associated with the occurrence site of the sudden braking, and wherein the dangerous location specification unit, according to a request designating weather from the user terminal, specifies an occurrence site of sudden braking as a dangerous location based on the sudden braking information corresponding to a weather condition requested.

9. The map provision server according to claim 1, wherein the dangerous location specification unit specifies the dangerous location using a different judgment threshold according to a magnification of a map requested from the user terminal.

10. A map provision method of providing a map that enables posting of risk information relating to road traffic to a user terminal, the method being executed by a computer and comprising the steps of:

acquiring driving information including occurrences of sudden braking and occurrence sites of the sudden braking from a plurality of vehicles;

storing, to be associated, sudden braking information for determining a sudden braking repeated occurrence situation that is calculated based on a number of sudden braking occurrences having occurred for each of the occurrence sites of the sudden braking, based on the driving information acquired in the step of acquiring;

specifying an occurrence site of sudden braking as a dangerous location based on the sudden braking information;

arranging, according to a request via the user terminal from a user, the dangerous location on a map according to a request, and generating a posting column capable of accepting a posting from the user terminal to be associated with the dangerous location thus arranged, in conjunction with a transportation means of the user; and providing a map including the posting column to the user terminal.

11. The map provision method according to claim 10, wherein the step of specifying specifies, based on a number of sampled vehicles within a fixed time period, by using sudden braking frequency calculated by dividing the number of sudden braking occurrences by a number of sampled vehicles as the sudden braking information in a case of the number of sampled vehicles being large, and by using a number of sudden braking occurrences as the sudden braking information in a case of the number of sampled vehicles being small.

12. The map provision method according to claim 10, further comprising a step of accepting a posting in relation to the dangerous location from the user terminal via the posting column in conjunction with a transportation means of the user, and storing posting contents thus accepted and the transportation means to be associated with the dangerous location.

13. The map provision method according to claim 12, further comprising a step of adding the posting contents and the transportation means associated with the dangerous location to be displayable.

14. The map provision method according to claim 13, wherein the step of adding adds, according to a request designating the transportation means from the user terminal requesting a map, only posting contents corresponding to the transportation means identified at the dangerous location to be displayable.

15. The map provision method according to claim 13, wherein the posting column at least includes a posting item of selectable format, and
wherein the step of adding displays posting contents having a large number of selections for the posting item on the map.

16. The map provision method according to claim 10, wherein the step of acquiring acquires driving information including time,
wherein the step of storing stores in conjunction with the time to be associated with the occurrence site of the sudden braking, and
wherein the step of specifying, according to a request designating a time slot from the user terminal, specifies an occurrence site of sudden braking as a dangerous location based on the sudden braking information in the time slot requested.

17. The map provision method according to claim 10, wherein the step of acquiring acquires driving information including a weather condition during driving,
wherein the step of storing stores in conjunction with the weather condition to be associated with the occurrence site of the sudden braking, and
wherein the step of specifying, according to a request designating a weather condition from the user terminal, specifies an occurrence site of sudden braking as a dangerous location based on the sudden braking information for the weather condition requested.

18. The map provision method according to claim 10, wherein the step of specifying specifies the dangerous location using a different judgment threshold according to a magnification of a map requested from the user terminal.

* * * * *